United States Patent [19]

Ferguson

[11] Patent Number: 5,021,250

[45] Date of Patent: Jun. 4, 1991

[54] APPARATUS AND METHOD FOR DISPENSING PURIFIED AND CARBONATED LIQUIDS

[75] Inventor: George Ferguson, Kelowna, Canada

[73] Assignee: Filtercold Corporation, Tempe, Ariz.

[21] Appl. No.: 358,483

[22] Filed: May 26, 1989

Related U.S. Application Data

[63] Continuation-in-part of Ser. No. 295,782, Jan. 10, 1989, abandoned.

[51] Int. Cl.[5] ........................... A23L 2/00; B67D 1/00

[52] U.S. Cl. .................................. 426/231; 99/323.1; 222/1; 222/129.1; 222/189; 261/DIG. 7; 426/477

[58] Field of Search ....................... 426/477, 519, 231; 99/323.1; 261/DIG. 7, 122, 5; 210/416.1, 416.3; 222/1, 129.1, 189, 190

[56] References Cited

U.S. PATENT DOCUMENTS

| | | | |
|---|---|---|---|
| 2,503,376 | 4/1950 | Burgess | 261/DIG. 7 |
| 3,256,802 | 6/1966 | Karr | 261/122 |
| 3,397,871 | 8/1968 | Hasselberg | 261/DIG. 7 |
| 3,746,323 | 7/1973 | Buffington | 261/DIG. 7 |
| 3,780,198 | 12/1973 | Pahl et al. | 261/122 |
| 3,943,261 | 3/1976 | Amon et al. | 426/477 |
| 4,040,342 | 8/1977 | Austin et al. | 261/DIG. 7 |
| 4,218,317 | 8/1980 | Kirschmann | 210/416.3 |
| 4,528,095 | 7/1985 | Byrne | 210/416.3 |
| 4,660,741 | 4/1987 | Kirschner et al. | 261/5 |
| 4,759,474 | 7/1988 | Regunathan et al. | 210/416.3 |

*Primary Examiner*—George Yeung
*Attorney, Agent, or Firm*—David G. Rosenbaum

[57] ABSTRACT

An apparatus and method for obtaining a liquid, such as water from a source, purifying the liquid, supplying a carbonating gas, such as $CO_2$, to the pre-purified liquid and dispensing either a carbonated and purified supply of water or purified water only from a tap.

48 Claims, 2 Drawing Sheets

APPARATUS AND METHOD FOR DISPENSING PURIFIED AND CARBONATED LIQUIDS

This is a continuation-in-part of co-pending application Ser. No. 07/295,782 filed on Jan. 10, 1989, now abandoned.

BACKGROUND OF THE INVENTION

The present invention relates generally to an apparatus and method for purifying, carbonating and dispensing a liquid from tap. This invention relates more particularly to an apparatus and method for obtaining a liquid, such as water from a source, purifying the liquid, supplying a carbonating gas, such as $CO_2$, to the pre-purified liquid and dispensing either a carbonated and purified supply of water or purified water only from a tap.

Carbonated beverages have been quite popular for a considerable period of time. For many years seltzer water or soda water, consisting of purified carbonated water with or without salt, have been the drink of choice of millions of people worldwide. To date, however, those desiring to drink carbonated water either purchased bottled carbonated water at the store, purchased it from a fountain or made carbonated water in a small bottle, usually one or two liters in size, by using a $CO_2$ cartridge to charge tap water with carbonation. Despite the wide spread popularity of drinking carbonated water, there is no apparatus or method of making carbonated water available in the home, workplace or commercial area which taps into the plumbing, filters the water and charges the purified water with carbonation for dispensing at a faucet.

Presently a number of different apparatus exist for carbonating a liquid and a number of different apparatus exist for purifying a liquid. However, no single apparatus exists which purifies and carbonates a liquid obtained from a building's water source. Each of the conventional carbonation apparatus are characterized by having a carbonation chamber which, generally, consists of a reservoir for holding the fluid to be charged with the carbonating gas and a gas inlet for introducing the carbonating gas directly into the fluid contained in the reservoir. Typically, each of the carbonation chamber containers have at least three ports associated with the container. A first port is a fluid inlet port for introducing the fluid to be charged with the carbonating gas into the container. A second port is the gas inlet port for introducing the carbonating gas into the fluid contained within the container. The third port is a fluid outlet port for evacuating the carbonated fluid from the container. Examples of presently existing apparatus for carbonating and dispensing a liquid are show in U.S. Pat. No. 4,497,348 issued Feb. 5, 1985 to Jason Sedam and entitled "APPARATUS AND METHOD FOR LOADING SYRUP AND $CO_2$ CONTAINERS INTO A PORTABLE POST-MIX BEVERAGE DISPENSER UNIT;" U.S. Pat. No. 4,509,569 issued Apr. 9, 1985 to Bengt O. Adolfsson and entitled "ARRANGEMENT FOR SUPPLYING GAS TO A LIQUID IN A CONTAINER THEREFORE;" U.S. Pat. No. 4,514,994 issued May 7, 1985 to Kenneth G. Mabb and entitled "APPARATUS FOR AERATING LIQUIDS;" U.S. Pat. No. 4,564,126 issued Jan. 14, 1986 to Bengt O. Adolfsson and entitled "ARRANGEMENT FOR SUPPLYING GAS TO A LIQUID IN A CONTAINER THEREFORE;" U.S. Pat. No. 4,597,509 issued July 1, 1986 to LeRoy A. Pereira and entitled "DRINKING WATER DISPENSING UNIT AND METHOD;" and U.S. Pat. No. 4,708,827 issued Nov. 24, 1987 to John R. McMillin and entitled "METHOD OF AND APPARATUS FOR MAKING AND DISPENSING CARBONATED WATER WITH A DOUBLE DIAPHRAGM PNEUMATIC WATER PUMP."

In each of these examples of conventional carbonation units the carbonating gas is introduced directly into the fluid contained within the carbonation chamber. It is to be noted that in each of these conventional apparatus, the fluid to be charged with the carbonating gas is introduced into the carbonating chamber prior to introduction of the carbonating gas. The carbonating gas is, therefore, charged into a stagnant reservoir of the fluid. The resulting gas-fluid intermixing within the carbonating chamber provides unsatisfactory gas loading in the fluid. Thus, upon dispensing of the carbonated beverage, the carbonated state of the fluid is more transient due to the lower level of gas saturation in the fluid. This typically provides unsatisfactory commercial results and consumer response to the product.

U.S. Pat. Nos. 4,497,348, 4,509,569 and 4,564,126 disclose carbonating apparatus which charge a reservoir of unchilled fluid with a carbonating gas. However, in each case the apparatus relies upon pressurization within the carbonation chamber to maintain the gas-saturation level within the fluid. Upon evacuation of the charged fluid from the carbonation chamber, however, the carbonated fluid is exposed to an immediate decrease in ambient pressure which results in rapid depletion of the carbonation level in the fluid.

As recognized in U.S. Pat. No. 4,514,994, it is well known that carbonation loading of water is improved if the water is chilled prior to charging with the carbon dioxide gas. As further recognized in that patent, it is usual to include, in the known carbonating plants, a cooler for cooling the water before carbonation, or to provide refrigerated water prior to introducing the carbonating gas. Because the use of cooled water facilitates carbonation, refrigeration units or other means for chilling the water prior to carbonation are important components of U.S. Pat. Nos. 4,597,509, 4,514,994 and 4,708,827.

Heretofore, however, satisfactory carbonation has been difficult to achieve without use of refrigeration units. Thus, a need has existed for an apparatus which produces carbonated liquid from an unchilled liquid source. An important aspect of the present invention is to provide an apparatus and method for producing carbonated water employing the existing building plumbing as a water source and a carbonation unit employing a carbonation diffuser for mixing the carbonating gas and water and discharging a finely charged flow of carbonated water.

A second important aspect of the present invention is to provide a filtration unit interdisposed between the water source and the carbonation unit. The filtration unit acts to prefilter the water conducted from the water source prior to introducing the purified water into the carbonation chamber. There are, of course, numerous and diverse types of water filters. Examples of such conventional water filters may be found in U.S. Pat. No. 3,535,235 issued Oct. 20, 1970 to A. C. Schouw and entitled "FILTER APPARATUS;" U.S. Pat. No. 3,950,253 issued Apr. 13, 1976 to Emanuel Stern and entitled "DOMESTIC WATER FILTRATION APPARATUS;" U.S. Pat. No. 3,963,620 issued June 15, 1976 to Zdenek Vor and entitled "PURIFICATION FILTER FOR LIQUIDS;" U.S. Pat. No. 4,049,550 issued Sept. 20, 1977 to Louis Obidniak and entitled "WATER FILTRATION MODULE;" U.S. Pat. No. 4,312,754 issued Jan. 26, 1982 to Pierre LaFonaine and entitled "PORTABLE WATER PURIFIER ESPECIALLY FOR DOMESTIC USE;" and U.S. Pat. No. 4,609,466 issued Sept. 2, 1986 to Calvin W. McCausland et al and entitled "PORTABLE WATER PURIFICATION SYSTEM." In each of the foregoing patents there is disclosed an in-line water filter apparatus which is interdisposed between a water source and an outlet port through which purified water is withdrawn from the circuit.

None of the foregoing patents disclose an apparatus for purifying, carbonating and dispensing both purified and purified uncarbonated water and purified carbonated water from a tap. A need has been recognized, therefore, to provide a simple apparatus capable of dispensing both purified uncarbonated water and purified carbonated water from tap.

SUMMARY OF THE INVENTION

Accordingly, it is a broad object of the present invention to provide a simple apparatus and method of dispensing both purified uncarbonated water and purified carbonated water from a tap.

It is another object of the present invention to provide an apparatus and method employing a filtration device and a carbonation chamber for charging purified water with a carbonating gas.

It is still another object of the present invention to provide an apparatus and method for purifying water from a water source, conducting the purified water to the carbonation chamber, carbonating the water and conducting the carbonated water to tap.

It is still another object of the present invention to provide an apparatus and method employing a fitting for shunting purified water to tap and bypassing the carbonation chamber.

It is yet another object of the present invention to provide an apparatus and method for purifying and carbonating water wherein there is provided a turbulation unit disposed downline from the carbonation unit for increasing turbulent intermixing of the carbonation gas and the purified water.

It is still yet another object of the present invention to provide an apparatus and method for purifying and carbonating water wherein there is provided a reservoir disposed downline from the turbulation unit for containing and holding a supply of purified and carbonated water and maintaining intra-circuit water pressure prior to dispensing the water from the tap.

It is another object of the present invention to provide an apparatus and method for purifying and carbonating fluids having a unitary carbonation apparatus which charges the purified fluid with the carbonating gas and acts as a carbonated fluid reservoir for dispensing the carbonated fluid on demand.

It is a further object of the present to provide a unitary carbonation apparatus which charges a purified fluid with a carbonating gas by controlling the introduction of the carbonating gas into a carbonating chamber in response to a fluid pressure decrease in the carbonating chamber.

It is another further object of the present invention to provide a unitary carbonation apparatus in which the flow of purified fluid and the flow of carbonating gas into the carbonation chamber represent opposite flow vectors, thereby causing turbulent intermixing of the purified fluid with the carbonating gas within the carbonation chamber.

It is a further object of the present invention to provide a main cabinet enclosure to enclose the filtration unit, carbonation chamber, turbulation unit and reservoir and provide removable connections to an external tap, external water supply and carbonating gas supply.

These and other objects features and advantages of the present invention will become more apparent to those skilled in the art from the following more detailed description of the preferred embodiment of the present invention with reference to the accompanying drawings.

DETAILED DESCRIPTION OF THE PREFERRED EMBODIMENTS

Figure 1:
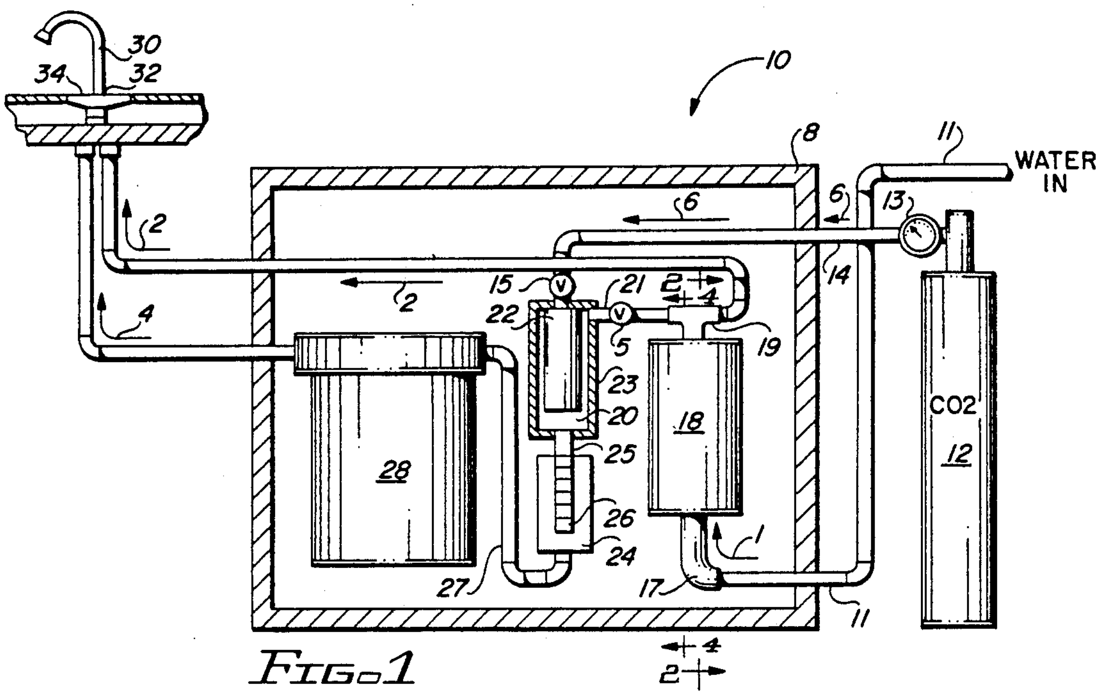
FIG. 1 is a schematic view of the water filtration and carbonation apparatus of the present invention.

With reference to the accompanying Figures, in which like reference numerals identify like features, and with particular reference to FIG. 1, there is shown an apparatus for filtration and carbonation of a fluid. Purification and carbonation apparatus 10 is primarily adapted for under-counter installation. However, those skilled in the art will appreciate and understand that the present invention is not intended, nor should it be construed, as being limited to such adaptation. The filtration and carbonation apparatus 10 of the present invention may also be adapted for above-counter, portable, temporary or permanent installation.

In accordance with the preferred embodiment of the present invention, filtration and carbonation apparatus consists generally of a water supply tubing 11 which is operably connected to receive water from a water source, such as the building plumbing, a carbonating gas supply 12, typically carbon dioxide gas, a filtration unit 18, and a carbonation chamber 20 disposed downstream from the filtration unit 18.

The carbonating gas source 12 has a gas supply line 14 which conducts the carbonating gas from the carbonating gas source 12 to the carbonating unit 20. A check valve 5 is disposed in the gas supply line proximate to entry of the gas supply line 14 into the carbonating unit 20. Check valve 15 is disposed in the gas supply line 14 to provide unidirectional control of the flow of carbonating gas into the carbonating unit 20.

A water inlet line 11 is coupled in fluid flow communication to a water supply pipe (not shown) in the normal plumbing of the place of installation. In alternate embodiments of the present invention, however, water inlet line 11 may be connected to any water source, such as a water storage tank.

Because of variable water pressures encountered in building plumbing and because of fluctuations in water pressure due to operation of other water consuming equipment in the building in which the apparatus 10 may be installed, it has been found desirable to fit the carbonating gas source 12 with a pressure regulator 13. Pressure regulator 13 senses the water pressure in the water inlet line 11 and activates or deactivates the release of the carbonating gas from the carbonating gas source 12 in response to fluctuations in the water pressure in the water inlet line 11. Pressure regulator 13 is preferably a differential pressure regulator which may be pre-set to maintain a desired pressure differential between the water pressure sense in the water inlet line and the gas pressure released from the carbonating gas source 12. Since the filtration and carbonation apparatus 10 of the present invention operates in a closed circuit, it is necessary to maintain a positive water pressure to prevent buildup of the carbonating gas in the apparatus. Accordingly, the pressure regulator must be set to maintain the water pressure in the circuit at a higher level than that of the carbonating gas pressure from the carbonating gas source 12.

Water inlet line 11 conducts a water flow 1 from the water source (not shown) to the filtration unit 18. Purification unit 18 is provided with an associated inlet 17 for receiving the water flow 1 conducted from water inlet line 11 and introducing the water flow 1 into the filtration unit 18. An outlet 19 is provided to conduct purified water flows 2 and 4 away from the purification unit 18. Connection means 21 is coupled in fluid flow communication with outlet 19 of the purification unit 18 and conducts purified water from the purification unit 18 to carbonation unit 20. In accordance with the preferred embodiment of the present invention, connection means 21 consists of a tee-fitting which bifurcates water flow 1 into two flow vectors 2 and 4 as it exits the purification unit 18. Flow 2 is diverted to a purified water tap 32 and flow 4 is directed downstream by fluid conduit 21 to the carbonation unit 20. A check valve 5 is preferably disposed in line with fluid conduit 21 to provide unidirectional control of fluid flow 4 to the carbonating unit 20.

Figure 2:
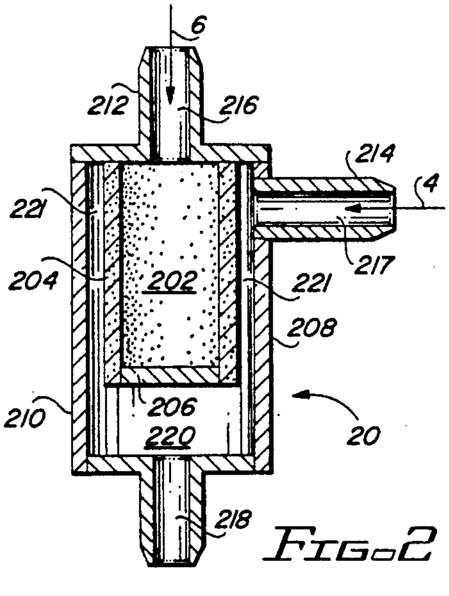
FIG. 2 is a side elevational cross-sectional view of the carbonation unit of the water filtration and carbonation apparatus of the present invention.

Carbonation unit 20 is described more fully with reference to FIG. 2. Carbonation unit 20 consists of an enclosure 210 which defines a hollow chamber 220. At least three ports 216, 217 and 218 are associated with hollow enclosure 208 and serve as the carbonating gas inlet 216, the fluid inlet 217 and carbonated fluid outlet 218. Each of gas inlet port 216, fluid inlet port 217 and carbonated fluid outlet port 218 consists of a releasable coupling, such as a compression fitting or the like, to facilitate coupling and decoupling of the carbonation unit 20 for servicing or replacement. In conjunction with the carbonation unit there is provided a carbonation diffuser 22 consisting of a hollow generally tubular member defining an inner chamber 202 and having a gas inlet 216 disposed at one end thereof for introducing the carbonating gas flow 6 into the inner chamber 202. Carbonation diffuser 22 is concentrically disposed within the hollow enclosure 208 of the carbonation unit 20 and positioned to receive the carbonating gas flow 6 through gas inlet 216. Gas inlet 216 is provided with a gas inlet fitting 212 associated therewith for removably coupling gas inlet 216 to carbonating gas supply line 14.

Carbonation diffuser 22 has microporous side portions 204 which are gas-permeable to the carbonating gas and a non-porous bottom portion 206 which is gas-impermeable to the carbonating gas. In accordance with the preferred embodiment of the present invention, the carbonation diffuser 22 consists of spun polyethylene with the gas permeable microporous side portions 204 having a mean pore size of about 15$\mu$ to about 35$\mu$ and a minimum pore volume of about 35%. An example of a suitable carbonation diffuser 22 is that manufactured by Pore Technologies Corporation under the mark POREX N-44.

An interstitial space 221 is defined between the gas-permeable microporous side portions 204 of the carbonation diffuser 22 and the enclosure 208. A fluid inlet fitting 214 is coupled to the fluid receiving tube 208 and disposed in a generally superior position relative to the lengthwise dimension thereof. Fluid inlet fitting 214 is in fluid flow communication with fluid inlet port 217 of the hollow enclosure 208 and conducts fluid flow 4 from the purification unit 18 through the fluid inlet fitting 214 and into the interstitial space 221. The fluid passing within interstitial space 221 is exposed to micro-bubbles of carbonating gas passing through the gas-permeable side portions 204 of the carbonation diffuser 22, thereby charging the fluid with carbonation. After being charged with carbonation, the carbonated fluid is conducted away from the carbonation unit 20 through carbonated fluid exit port 218 and into a downstream fluid conduit 25.

Figure 3:
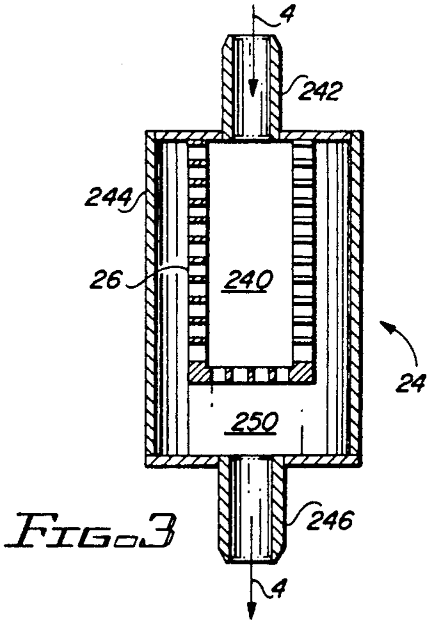
FIG. 3 is a side elevational cross-sectional view of the turbulation unit of the water filtration and carbonation apparatus of the present invention.

After the carbonated water flow 4 leaves fluid exit port 218, it is conducted to a turbulation unit 24. Turbulation unit 26 is best illustrated with reference to FIG. 3 of the accompanying drawings.

Turbulation unit 24 consists of a hollow outer enclosure member 244 defining an inner chamber 250 having at least two ports 242 and 246 accessing the inner chamber 250. The carbonated water flow 4 is introduced into the turbulation unit 24 through a carbonated water inlet port 242. A turbulation screen 26 is disposed within the inner chamber 250 and positioned to receive the carbonated water flow 4 from the carbonated water inlet port 242. Turbulation screen 26 consists of a hollow member having a plurality of relatively large openings about its surfaces. Upon encountering the carbonated water flow 4, the openings in turbulation screen 26 disrupt and disperse water flow 4 within the hollow outer enclosure member 244. The turbulation imparted by the turbulation unit 26 facilitates gas-liquid saturation, thereby causing a finer gas-liquid mix. After the turbulent mixing of the carbonated water, the carbonated water flow 4 exits through carbonated water outlet port 246 and is conducted away from the turbulation unit 26 by fluid conduit 27.

Finally, a carbonated water reservoir 28 is provided downstream from the turbulation unit 24. Reservoir 28 acts a sump for the purified and carbonated water prior to evacuation through tap 30. Reservoir 28 is also provided as an additional means for maintaining water pressure within the closed circuit of the purification and carbonation apparatus 10. In the unlikely event that the pressure regulator 13 should fail, or a leak develop in the system, the presence of the reservoir 28 ensures that no carbonating gas will evacuate through the tap 30. Further, in the event that there is a gas buildup in the circuit, reservoir 28 may be tapped to safely evacuate the gas from the circuit and restore a positive water pressure within the circuit.

Figure 4:
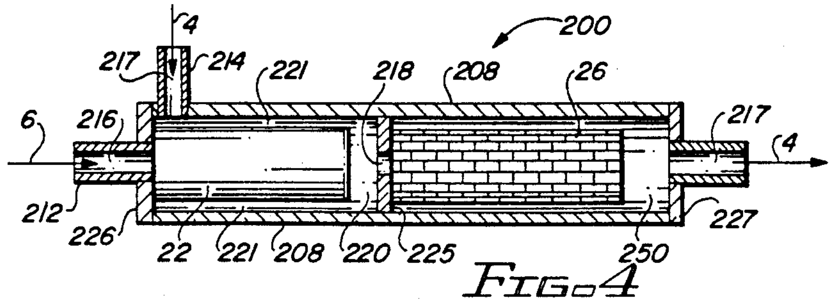
FIG. 4 is a side elevational cross-sectional view of a combined carbonation and turbulation unit in accordance with an alternative preferred embodiment of the present invention.

In accordance with an alternative preferred embodiment of the present invention, and with particular reference to FIG. 4, there is shown a unitary carbonation and turbulation chamber 200. Unitary carbonation and turbulation chamber 200 may be placed in carbonation and filtration apparatus 10 in place of separate carbonation unit 20 and separate turbulation unit 24. Unitary carbonation and turbulation chamber 200 consists of an outer housing 208, preferably a hollow tubular member, having end enclosures 226 and 227, each end enclosure 226, 227 further having an opening associated therewith for conducting fluid or out of the chamber 200. Unitary carbonation and turbulation chamber 200 also has at least a fluid inlet 217, a carbonating gas inlet 216, preferably, but not necessarily, associated with end enclosure 226, and a fluid outlet 218 associated with end enclosure 227.

To facilitate acceptable gas loading of the fluid within the unitary carbonation and turbulation chamber 200, it has been found desirable, but not required, to define at least two chambers within outer housing 208, each chamber being in fluid flow communication with a successive chamber. A first chamber 220 is provided as a carbonation chamber 220. A second chamber 250 is provided as a turbulation chamber 250.

Carbonation chamber 220, like the carbonation unit 20, has a fluid inlet 217 and a carbonating gas inlet opening 216 and fittings 214 and 212, respectively, associated therewith. However, because the carbonation and turbulation chamber 200 is a unitary apparatus, there is no corresponding need for a fitting associated with carbonated fluid outlet 218. Instead, carbonated fluid outlet opening 218 is disposed in a baffle 225 interdisposed between the carbonation chamber 220 and the turbulation chamber 250. In this manner, the fluid outlet opening 218 disposed in baffle 225 serves as a fluid conduit between the carbonation and turbulation chambers, 220 and 225, respectively. The need for fittings, couplings or tubing conduit between the carbonation unit 20 and the turbulation unit 24 is, therefore, eliminated by combining the two into a single unitary carbonation and turbulation chamber 220. As with the carbonation unit 20, a carbonation diffuser 22 is concentrically disposed within carbonation chamber 220 and positioned to receive carbonating gas flow 6 through carbonating gas inlet 216.

Carbonation chamber 220 operates in a substantially similar manner as the carbonation unit 20. Specifically, purified fluid flow 4 is conducted through fluid inlet 217 and into the interstitial space 221 defined by the outer surface of carbonation diffuser 22 and the inner surface of the hollow outer member 208. The fluid passing through interstitial space 221 is then carbonated in like manner as in the carbonation unit 20.

Turbulation chamber 250 operates in a manner virtually identical to that of turbulation unit 24. The principal difference in operation is that the carbonated fluid flow 4 passes directly through the fluid outlet 218 in baffle 225 and directly enters turbulation chamber 250. In this manner the need for a fluid inlet 242 of turbulation unit 24 is eliminated.

Thus, the apparatus 10 for purifying and carbonating fluid, in accordance with the preferred embodiment of the present invention, may employ separate carbonation unit 20 and turbulation unit 24 or may employ the unitary carbonation and turbulation chamber 220.

Figure 5:
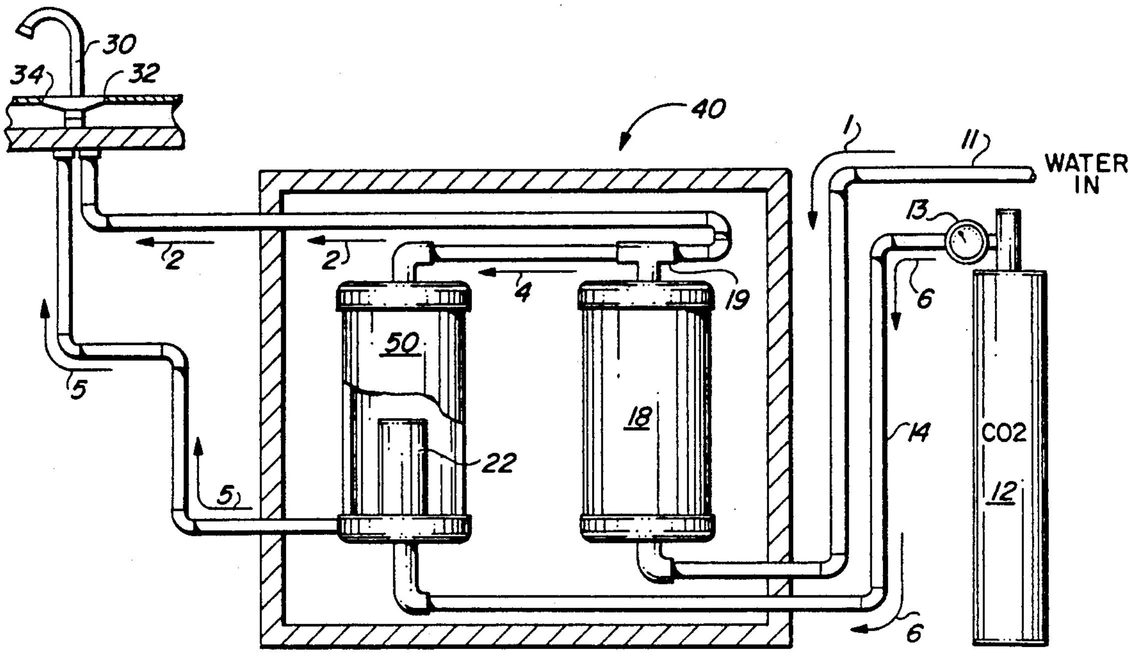
FIG. 5 is a schematic view of an alternative preferred embodiment of the water filtration and carbonation apparatus of the present invention.
Figure 6:
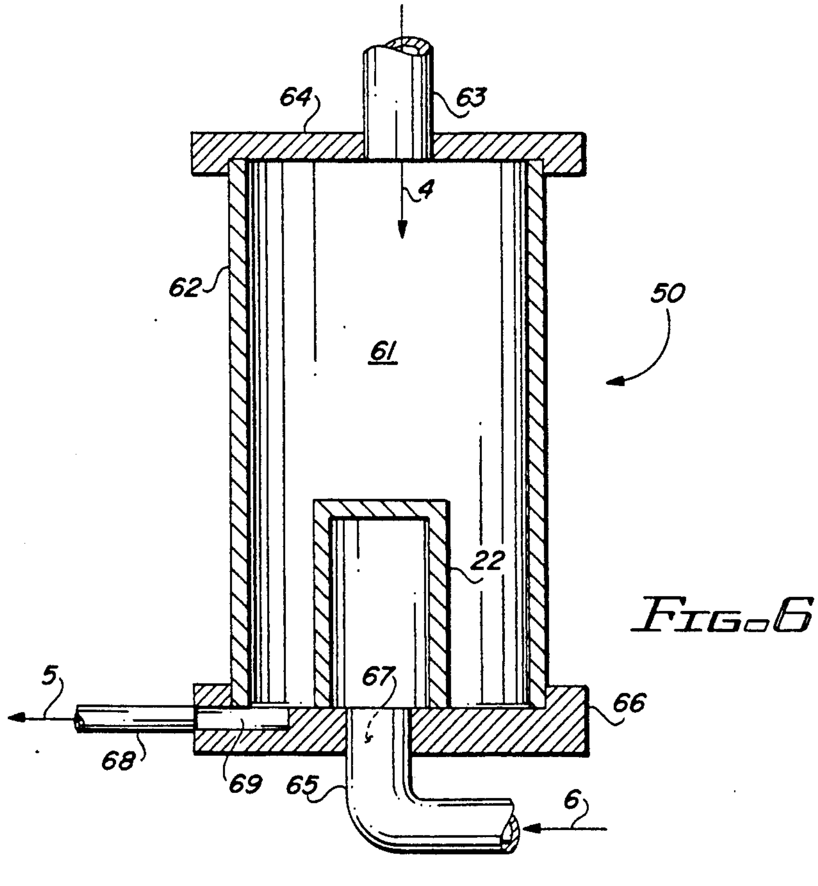
FIG. 6 is a side elevational cross-sectional view of an alternative preferred embodiment of the carbonation unit of the filtration and carbonation apparatus of the present invention.

An alternative preferred embodiment of the present invention contemplates a unitary carbonation chamber 50 as depicted in FIGS. 5 and 6 in the accompanying drawings. FIG. 5 illustrates the filtration and carbonation apparatus 40 of the present invention having a unitary carbonation chamber 50. Carbonation unit 50 consists of an enclosure 62 defining an inner chamber 61. Enclosure 61 has at least three ports associated therewith. A fluid inlet port 63 is provided to conduct a flow of purified fluid 4 into carbonation chamber 61. A carbonating gas inlet port 67 is provided to conduct the carbonating gas flow 6 from the carbonating gas source into the carbonation diffuser 22 disposed within carbonation chamber 61. According to the instant preferred embodiment, the carbonation diffuser 22 consists of a hollow tubular member made of a gas-permeable material, such as spun polyethylene, having all surfaces thereof being gas-permeable. An example of a suitable carbonation diffuser 22 is that manufactured by Pore Technologies Corporation under the mark POREX N-44. A carbonated fluid outlet port 69 conducts a carbonated water flow 5 outwardly from the carbonation chamber 61 to conduit leading to tap. In accordance with a preferred embodiment of the present invention, fluid inlet port 63 is disposed in an upper extremity of the carbonation chamber 61 such that the purified fluid flow 4 is introduced into an upper portion of the carbonation chamber 61. Carbonating gas inlet port 67 is provided at a lower extremity of the enclosure 62 in communication with the carbonation diffuser 22, such that carbonating gas flow 6 is conducted through carbonating gas inlet port 67 and into carbonation diffuser 22. Finally, carbonated fluid outlet port 69 is disposed in a lower extremity of carbonation chamber 61 and conducts carbonated fluid flow 5 out from carbonation chamber to fluid conduit leading to tap.

It will be appreciated, by those skilled in the art, that by disposing purified fluid inlet port 63, carbonating gas inlet port 67 and carbonated fluid outlet port 69 in the aforementioned arrangement, the purified fluid flow 4 and the carbonating gas flow 6 are introduced into carbonation chamber 61 in opposite flow vectors. In this manner, the purified water is charged with the carbonating gas through turbulent intermixing of the opposing flows.

In operation, carbonation unit 50 may both act as and replace the separate carbonation unit 20, turbulation unit 16 and reservoir 28, as well as the unitary carbonation and turbulation unit 200 previously described. In a static steady state condition, internal chamber 61 is filled with filtered water at the normal household water pressure of 30–60 p.s.i. The carbonating gas flow 6 is controlled by a pressure regulator 13, which is pre-set at a pressure lower than the water pressure. To ensure proper control of the carbonating gas flow 6 with respect to the purified fluid flow 4, the ratio of the static water pressure to the static gas pressure must be greater than 1 under steady state conditions. Thus, evacuation of carbonated fluid flow 5 causes a decrease in the water pressure within internal chamber 61 which lowers the water pressure to a point less than that of the gas pressure, thereby initiating the flow of carbonating gas through carbonation diffuser 22.

According to the preferred embodiment of the present invention, but not essential to it, tap 30 is provided with two handles 32 and 34 to actuate a purified water flow 2 or a purified and carbonated water flow 4, respectively, from a single faucet 30. Further, it may be deemed desirable to enclose the purification unit 18, carbonation unit 20, turbulation unit 26, reservoir 28 and associated fluid conduit within an outer enclosure cabinet 8. If an outer enclosure cabinet 8 is used, it will be preferable to provide a plurality of apertures passing through the outer enclosure cabinet 8 to enable the fluid conduit and gas conduit to pass through the walls of the outer enclosure cabinet 8. Alternatively, the plurality of apertures passing through the outer enclosure cabinet may consist of removable fittings such that the external fluid conduit and gas conduit may be removably coupled to the internal fluid conduit and gas conduit through the removable fittings in the outer enclosure cabinet.

It will be apparent to those skilled in the art, that the foregoing detailed description of the preferred embodiment of the present invention is representative of a type of apparatus for purification and carbonation of water within the scope and spirit of the present invention. Further, those skilled in art will recognize that various changes in materials, specific components or interrelationship between components may be altered or changed and remain within the scope and spirit of the present invention.

I claim:

1. An apparatus for dispensing a purified and carbonated liquid, comprising:

a liquid source for supplying a liquid to be purified and carbonated;

a carbonating gas source supply containing a carbonating gas;

purification means for receiving and purifying the liquid supplied from the liquid source, said purification means being disposed downstream from and in fluid flow communication with said liquid source;

carbonation means for receiving the purified liquid from said purification means, receiving said carbonating gas from said carbonating gas source supply and charging said purified liquid with said carbonating gas, said carbonation means disposed downstream from and in fluid flow communication with said purification means;

turbulation means, disposed downstream from and in fluid flow communication with said carbonation means, said turbulation means being for imparting flow turbulence to a flow of purified and carbonated liquid received from said carbonation means;

reservoir means, disposed downstream from and in fluid flow communication with said turbulation means, said reservoir means being for retaining and dispensing said purified and carbonated liquid.

2. The apparatus for dispensing a purified and carbonated liquid according to claim 1, wherein said carbonating gas is carbon dioxide and said carbonating gas source supply further including valve means for controlling the flow of carbon dioxide into the carbonation means.

3. The apparatus for dispensing a purified and carbonated liquid according to claim 1, wherein said purification means further comprises an inlet port for receiving a flow of liquid from said liquid source and an outlet port for conducting the liquid away from said purification means.

4. The apparatus for dispensing a purified and carbonated liquid according to claim 3, wherein said outlet port further comprises fitting means for bifurcating a flow of purified liquid into at least two flow components.

5. The apparatus for dispensing a purified and carbonated liquid according to claim 1, wherein said purification means further comprises a water filter.

6. The apparatus for dispensing a purified and carbonated liquid according to claim 5, wherein said water filter further comprises an activated charcoal water filter.

7. The apparatus for dispensing a purified and carbonated liquid according to claim 5, wherein said water filter further comprises a reverse osmosis water purifier.

8. The apparatus for dispensing a purified and carbonated liquid according to claim 1, wherein said carbonation means further comprises a hollow outer enclosure and a carbonation diffuser concentrically disposed within said hollow outer enclosure, thereby defining a chamber between said carbonation diffuser and said hollow tubular member.

9. The apparatus for dispensing a purified and carbonated liquid according to claim 8, wherein said hollow outer enclosure further comprises a plurality of apertures passing therethrough comprising at least a carbonating gas inlet aperture, a liquid inlet aperture and a carbonated liquid outlet aperture.

10. The apparatus for dispensing a purified and carbonated liquid according to claim 9, wherein said apparatus further comprises a plurality of releasable couplings associated with each of said plurality of apertures in said hollow tubular member.

11. The apparatus for dispensing a purified and carbonated liquid according to claim 8, wherein said carbonation diffuser further comprises a generally tubular member having gas-permeable side portions thereof and a gas-impermeable bottom portion thereof.

12. The apparatus for dispensing a purified and carbonated liquid according to claim 8, wherein said carbonation diffuser is spun polyethylene.

13. The apparatus for dispensing a purified and carbonated liquid according to claim 11, wherein said gas-permeable side portions have a mean pore size of in the range of about 15$\mu$ to 35$\mu$ and an average pore volume of about 35%.

14. The apparatus for dispensing a purified and carbonated liquid according to claim 1, wherein said turbulation means further comprises a hollow enclosure having at least a carbonated liquid inlet port for receiving a flow of carbonated liquid and a carbonated liquid outlet port for exhausting the flow of carbonated liquid, and a hollow tubular member having a plurality of relatively large apertures passing therethrough on all surfaces thereof, wherein said hollow tubular member is positioned to receive the flow of carbonated liquid passing through said carbonated liquid inlet port.

15. An apparatus for dispensing a purified and carbonated liquid, comprising:

a source for supplying a liquid to be purified and carbonated and fluid conduit associated with said source;

purification means for receiving and purifying the liquid conducted from said source, said purification means having a liquid inlet and a liquid outlet, said liquid outlet having a fitting associated therewith adapted to separate a liquid flow from said liquid outlet into at least two flow components, wherein one of said at least two flow components is conducted to a tap and a second of said at least two flow components is supplied to a downstream fluid conduit;

a carbonating gas source for supplying a carbonating gas, said carbonating gas source having gas conduit associated therewith;

differential pressure regulator means coupled to said carbonating gas source and to said fluid conduit associated with said source of liquid for sensing a pressure in said fluid conduit and actuating a flow of said carbonating gas from said carbonating gas source;

carbonation means for receiving the purified liquid from said downstream fluid conduit associated with said purification means, receiving said carbonating gas from said carbonating gas source supply and charging said purified liquid with said carbonating gas, said carbonation means comprising a. a hollow outer enclosure having a plurality of apertures passing therethrough comprising at least a carbonating gas inlet aperture, a liquid inlet aperture and a carbonated liquid outlet aperture, b. a carbonation diffuser comprising a generally tubular member having gas-permeable side portions thereof and a gas-impermeable bottom portion thereof, said carbonation diffuser being concentrically disposed within said hollow outer enclosure, and c. a plurality of releasable couplings associated with each of said plurality of apertures in said hollow tubular member;

turbulation means, disposed downstream from and in fluid flow communication with said carbonation means, said turbulation means being for imparting flow turbulence to a flow of purified and carbonated liquid received from said carbonation means;

reservoir means, disposed downstream from and in fluid flow communication with said turbulation means, said reservoir means being for retaining and dispensing said purified and carbonated liquid.

16. The apparatus for dispensing a purified and carbonated liquid according to claim 15, wherein said carbonation diffuser is spun polyethylene.

17. The apparatus for dispensing a purified and carbonated liquid according to claim 16, wherein said gas-permeable side portions have a means pore size of in the range of about 15μ to 35μ and an average pore volume of about 35%.

18. The apparatus for dispensing a purified and carbonated liquid according to claim 15, wherein said turbulation means further comprises a hollow enclosure having at least a carbonated liquid inlet port for receiving a flow of carbonated liquid and a carbonated liquid outlet port for exhausting the flow of carbonated liquid, and a hollow tubular member having a plurality of relatively large apertures passing therethrough on all surfaces thereof, wherein said hollow tubular member is positioned to receive the flow of carbonated liquid passing through said carbonated liquid inlet port.

19. An apparatus for carbonating a liquid, comprising:

an outer enclosure member having at least an inlet for a carbonating gas flow, an inlet for a fluid to be carbonated and an outlet for exhausting a carbonated fluid therefrom;

at least two chambers defined within said outer enclosure member, each of said chambers being in fluid flow communication with another of said chambers;

means for receiving and diffusing a carbonating gas flow into a fluid to be carbonated, said means being disposed within one of said at least two chambers and in fluid flow communication with each of said inlet for a carbonating gas flow and said inlet for a liquid to be carbonated; and means for imparting flow turbulence to the flow of the carbonated liquid, said means for imparting flow turbulence being disposed within another of said at least two chambers and in fluid flow communication with said outlet for exhausting carbonated liquid therefrom.

20. The apparatus for carbonating a liquid according to claim 19, wherein said means for receiving and diffusing a carbonating gas flow further comprises a carbonation diffuser comprising a generally tubular member having gas-permeable side portions thereof and a gas-impermeable bottom portion thereof.

21. The apparatus for carbonating a liquid according to claim 20, wherein said carbonation diffuser is spun polyethylene.

22. The apparatus for carbonating a liquid according to claim 20, wherein said gas-permeable side portions have a means pore size of in the range of about 15μ to 35μ and an average pore volume of about 35%.

23. The apparatus for carbonating a liquid according to claim 19, wherein said means for receiving and diffusing a flow of carbonated liquid flow further comprises a hollow tubular member having a plurality of relatively large apertures passing therethrough on all surfaces thereof.

24. A method for dispensing a purified and carbonated liquid, comprising the steps of:

introducing a supply of a liquid to a water purification unit;

providing a source of a carbonating gas and associated gas conduit;

purifying said supply of liquid in said water purification unit;

splitting a flow of said purified water as it exits said water purification unit, into at least two flow components;

providing a carbonation chamber having a outer enclosure, a carbonation diffuser disposed within said outer enclosure and a hollow tubular member coaxially interdisposed between said carbonation diffuser and said outer enclosure defining thereby a flow chamber between said carbonation diffuser and said hollow tubular member;

conducting at least one of said at least two flow components to said carbonation chamber;

conducting a second of said at least two flow components to a tap;

controlling the flow of said at least one of said at least two flow components of said purified water into said carbonation chamber;

simultaneously introducing a flow of said carbonating gas into said carbonation diffuser and a flow of said at least one of said at least two flow components into the flow chamber between said carbonation diffuser and said hollow tubular member, thereby charging said flow of liquid with said carbonating gas;

providing a turbulation chamber comprising an outer enclosure having at least a carbonated liquid inlet and a carbonated liquid outlet associated therewith and a hollow tubular member disposed within said outer enclosure, said hollow tubular member having a plurality of apertures passing through surfaces thereof;

conducting said carbonated liquid away from said carbonation chamber and into said turbulation chamber such that said flow of carbonated liquid passes through said plurality of apertures in said hollow tubular member causing a turbulent flow within said outer enclosure of said turbulation chamber;

providing a carbonated liquid reservoir having an inlet and an outlet thereof;

conducting said carbonated liquid away from said turbulation chamber and into said reservoir for storage; and dispensing said stored carbonated liquid from said reservoir by activating a carbonated liquid tap.

25. The method for dispensing a purified and carbonated liquid according to claim 24, wherein said step of simultaneously introducing a flow of said carbonating gas and a flow of said at least one of said at least two flow components, further comprises the step of sensing a pressure from said liquid source and controlling the flow of said carbonating gas in response to said sensed pressure.

26. An apparatus for dispensing a purified and carbonated liquid, comprising:

an external liquid source for supplying a liquid to be purified and carbonated;

a carbonating gas source supply containing a carbonating gas;

purification means for receiving and purifying the liquid supplied from the source, said purification means being disposed downstream from and in fluid flow communication with said liquid source; and a carbonator comprising an enclosure defining an interior carbonation chamber and having a purified liquid inlet, in fluid flow communication with said purification means, said enclosure being provided at a first end thereof with a carbonating gas inlet, in communication with said carbonating gas source supply, and at a second opposite end thereof provided with a carbonated liquid outlet in fluid flow communication with said interior carbonation chamber, said carbonator further having a carbonation diffuser communicating with said carbonating gas inlet and positioned such that a flow of purified liquid received in said interior carbonation chamber through said purified liquid inlet is directed toward said carbonation diffuser.

27. The apparatus for dispensing a purified and carbonated liquid according to claim 26, wherein said carbonating gas is carbon dioxide and said carbonating gas source supply further including valve means for controlling the flow of carbon dioxide into the carbonator.

28. The apparatus for dispensing a purified and carbonated liquid according to claim 26, wherein said purification means further comprises an inlet port for receiving a flow of said liquid supplied from said source and an outlet port for conducting a flow of said purified liquid away from said purification means.

29. The apparatus for dispensing a purified and carbonated liquid according to claim 28, wherein said outlet port of said purification means further comprises fitting means for bifurcating said flow of purified liquid into at least two flow components.

30. The apparatus for dispensing a purified and carbonated liquid according to claim 26, wherein said purification means further comprises a water filter.

31. The apparatus for dispensing a purified and carbonated liquid according to claim 30, wherein said water filter further comprises an activated charcoal water filter.

32. The apparatus for dispensing a purified and carbonated liquid according to claim 30, wherein said water filter further comprises a reverse osmosis water purifier.

33. The apparatus for dispensing a purified and carbonated liquid according to claim 26, wherein a gas inlet aperture is disposed in a lower portion of said enclosure in communication with a carbonation diffuser, a liquid inlet aperture is disposed in an upper portion of said enclosure in communication with said interior carbonation chamber, and a carbonated liquid outlet aperture is disposed in a lower portion of said enclosure in communication with said interior carbonation chamber.

34. The apparatus for dispensing a purified and carbonated liquid according to claim 26, said apparatus further comprising pressure regulator means for regulating a pressure of said carbonating gas to less than a pressure of said purified liquid in said carbonation means.

35. The apparatus for dispensing a purified and carbonated liquid according to claim 26, said apparatus further comprising pressure regulating means for regulating a flow of said carbonating gas in response to differential pressures of said purified liquid in said carbonation means.

36. The apparatus for dispensing a purified and carbonated liquid according to claim 35, wherein said enclosure further comprising a liquid inlet port and a carbonating gas inlet port, said liquid inlet port is positioned opposite to said carbonating gas inlet port.

37. The apparatus for dispensing a purified and carbonated liquid according to claim 33, wherein said carbonation diffuser further comprises a generally tubular gas-permeable member.

38. The apparatus for dispensing a purified and carbonated liquid according to claim 33, wherein said carbonation diffuser is spun polyethylene.

39. The apparatus for dispensing a purified and carbonated liquid according to claim 37, wherein said gas-permeable member has a plurality of porosities having a mean pore size of in the range of about 15 to 35 and an average pore volume of about 35%.

40. A method for dispensing a purified and carbonated liquid, comprising the steps of:

providing purification means for purifying a liquid, said purification means having a fluid inlet and fluid outlet thereof;

providing carbonation means for charging a liquid with a carbonating gas;

providing a carbonating gas source and associated gas conduit from said carbonating gas source to said carbonation means and in communication therewith;

introducing a flow of liquid into said purification means;

purifying said flow of liquid in said water purification means;

conducting said flow of purified liquid away from said purification means;

splitting said flow of purified water into at least two flow components;

conducting a first of said at least two flow components to said carbonation means;

conducting a second of said at least two flow components to a tap;

controlling a flow of said carbonating gas into said carbonation means in response to a pressure of said first of said at least two flow components in said carbonation means, whereby said first of said at least two flow components of purified liquid is charged with said carbonating gas; and conducting said charged liquid away from said carbonation means to said tap.

41. An apparatus for carbonating a fluid, comprising an enclosure defining an internal carbonation chamber and a micro-porous carbonation diffuser disposed within said internal carbonation chamber for communicating with an external carbonating gas source, said carbonation chamber further having a purified liquid inlet, in fluid flow communication with a liquid purification means, said enclosure being provided at a first end thereof with a carbonating gas inlet, in communication with said carbonating gas source supply, and at a second opposite end thereof provided with a carbonated liquid outlet in fluid flow communication with said interior carbonation chamber, said carbonation diffuser communicating with said carbonating gas inlet and positioned such that a flow of purified liquid received in said internal carbonation chamber through said purified liquid inlet is directed toward said carbonation diffuser.

42. The apparatus for carbonating a fluid according to claim 44, wherein said gas inlet aperture is disposed in a lower portion of said enclosure in communication with said carbonation diffuser, said liquid inlet aperture is disposed in an upper portion of said enclosure in communication with said internal carbonation chamber and said carbonated liquid outlet aperture is disposed in a lower portion of said enclosure in communication with said internal carbonation chamber.

43. The apparatus for dispensing a purified and carbonated liquid according to claim 41, said apparatus further comprising pressure regulator means for regulating a pressure of said carbonating gas to less than a pressure of said purified liquid in said carbonation means.

44. The apparatus for dispensing a purified and carbonated liquid according to claim 41, said apparatus further comprising pressure regulating means for regulating a flow of said carbonating gas in response to differential pressures of said purified liquid in said carbonation means.

45. The apparatus for carbonating a fluid according to claim 44, wherein said flow of carbonating gas and a flow of said purified liquid into said internal chamber of said carbonation means comprise opposite flow vectors.

46. The apparatus for carbonating a fluid according to claim 41, wherein said carbonation diffuser further comprises a generally tubular gas-permeable member.

47. The apparatus for carbonating a fluid according to claim 46, wherein said carbonation diffuser is spun polyethylene.

48. The apparatus for carbonating a fluid according to claim 46, wherein said gas-permeable member has a plurality of porosities having a mean pore size of in the range of about 15 to 35 and an average pore volume of about 35%.

* * * * *